Feb. 26, 1952     J. M. FLUKE     2,586,804
SYSTEM FOR MEASURING ELECTRICAL QUANTITIES
Filed Oct. 16, 1945     5 Sheets-Sheet 1

Inventor

JOHN M. FLUKE

By Ralph L. Chappell
               Attorney Feb. 26, 1952  J. M. FLUKE  2,586,804
SYSTEM FOR MEASURING ELECTRICAL QUANTITIES
Filed Oct. 16, 1945  5 Sheets-Sheet 2

Inventor
JOHN M. FLUKE
By Ralph L Chappell
Attorney

Feb. 26, 1952  J. M. FLUKE  2,586,804
SYSTEM FOR MEASURING ELECTRICAL QUANTITIES
Filed Oct. 16, 1945  5 Sheets-Sheet 3

FIG. 5

Inventor
JOHN M. FLUKE
By Ralph L. Chappell
Attorney

Feb. 26, 1952     J. M. FLUKE     2,586,804
SYSTEM FOR MEASURING ELECTRICAL QUANTITIES
Filed Oct. 16, 1945     5 Sheets-Sheet 4

Inventor

JOHN M. FLUKE

By Ralph L. Chappell

Attorney

Feb. 26, 1952 J. M. FLUKE 2,586,804
SYSTEM FOR MEASURING ELECTRICAL QUANTITIES
Filed Oct. 16, 1945 5 Sheets-Sheet 5

Inventor
JOHN M. FLUKE
By Ralph L. Chappell
Attorney

Patented Feb. 26, 1952

2,586,804

UNITED STATES PATENT OFFICE 2,586,804

SYSTEM FOR MEASURING ELECTRICAL QUANTITIES

John M. Fluke, United States Navy

Application October 16, 1945, Serial No. 622,668

22 Claims. (Cl. 171—95)

(Granted under the act of March 3, 1883, as amended April 30, 1928; 370 O. G. 757)

My invention relates to producing voltages proportional to the voltages, current, powers, or products thereof existing in an electric circuit. Further, my invention relates to changing a voltage from one reference potential to another. My invention also provides for the measurement by direct indication by conventional direct current meters of any of these quantities. The entire system of my invention is applicable to a wide variety of conditions in electrical circuits, and particularly is it capable of application over a wide range of frequency without appreciably loading the circuit to which it is applied.

Methods of measuring power in electrical circuits operating at frequencies much in excess of commercial power frequencies, such as even the low audio frequencies have, in general, been accomplished by indirect methods. Typical of these methods is that of measuring the current flowing to a load whose effective resistance at the frequency and current involved has been previously calculated or measured. The power dissipated in this load is then determined by multiplying this effective resistance by the square of the measured current. This method is applicable over a large frequency range including both audio and radio frequencies.

A photometric method for measuring power has been employed utilizing substitution methods wherein the light output of an incandescent lamp, serving as a load, is measured. The power dissipated in the lamp is then determined by measuring with conventional instruments the D.-C. power input required to produce the same light output.

Some methods are available by which direct measurement of power may be made at frequencies higher than the usual range of commercial power frequencies. For instance, in certain applications specially designed dynamometer wattmeters have been developed to measure power at frequencies up to about 3000 cycles per second. A second direct power measurement method utilizes three ammeters inserted in a circuit from whose readings the power flowing may be calculated. This method is more fully described in Terman's "Radio Engineer's Handbook," McGraw-Hill, New York, first edition, page 938.

A means of measuring power employing vacuum tubes, wherein two tubes are connected to act as a balanced modulator, is disclosed in U. S. Patent 1,586,533, dated June 1, 1926. A sensitive D.-C. ammeter is connected to read the difference of the currents flowing in the two plate circuits which reading is directly proportional to the power flowing in the circuit to which the modulator is connected.

Cathode ray and magnetic oscillographs as well as thermocross bridges and differential transformers have been used to measure power under special conditions (see Hund, "High Frequency Measurements," 1933, McGraw-Hill, New York, pages 301 through 304).

The above-described methods of power measurement at audio and radio frequencies all involve special characteristics which limit their utility for general power measurement or their use in producing voltages proportional to power or current which could be utilized for control or other purposes. The most widely used method, that of measuring current flowing to a load whose effective resistance is known is accurate only to the extent that the effective resistance is known. Inasmuch as the effective resistance does not ordinarily bear a known relation to the exciting current in the usual load operating at audio or radio frequencies, it is necessary to measure the effective resistance of the load through the entire range of frequency and current over which power measurements are desired. These measurements are frequently difficult to make with a reasonable degree of accuracy. More frequently it is either impossible or extremely difficult to calculate these quantities. If the applied voltage contains several frequency components, this method is generally inapplicable as the effective currents and effective resistances at each frequency are very difficult of determination.

Dynamometer wattmeters for direct measurement of power are suitable for frequencies up to about 3000 cycles per second and therefore do not cover the entire audio frequency spectrum. These meters are of no use at radio frequencies. Furthermore, these instruments require appreciable power for their operation. This power may be so great compared to that available in the circuit being measured as to make this type of wattmeter inapplicable and entirely inaccurate through its heavy loading of the circuit and its resultant large modification or distortion of circuit currents, voltages, and circuit constants.

The three ammeter method is likewise subject to the difficulties inherent in excessive circuit loading of circuits to which it may be applied for power measurement. Furthermore, no direct reading of power is obtained, it being necessary to solve a rather complex equation to resolve the ammeter readings to terms of circuit powers. If the load is highly reactive or the circuit constants are not chosen at the optimum values, the accuracy of this method is very poor even though the power requirements of the wattmeter circuit itself are not significant.

The system of power measurement described in U. S. Patent 1,586,533 affords a means of directly reading power but is limited by the requirement that the two tubes used in the modulator be closely matched as to their characteristics and that they remain in this condition during operation. This is a requirement substantially impossible of practical accomplishment because of the aging of the vacuum tubes utilized in this method, changes in cathode emission in these tubes and the minute random fluctuation of electron current having large effect on the relatively small difference current read by the sensitive D.-C. ammeter utilized in the direct reading of circuit watts. This method therefore does not provide for stable meter operation nor does it retain calibration over long periods of time. Another deficiency of this method is that the cathodes of the tubes are above ground potential. This requires that the power supply system for furnishing direct current to the modulator tube plates and to any amplifiers utilized to amplify the circuit quantities prior to their application to the balanced modulator be ungrounded. The capacity and conductance of power supply circuit components such as the power transformer, filter capacitors and reactors to ground therefore may be appreciable and result in introducing highly excessive shunting effect on the circuit in which power is to be measured. This limitation may be slightly diminished by utilizing battery plate supplies for the modulator and by utilizing wide space separation of the battery from surrounding objects. Usually the short life of small batteries is such, however, as to materially detract from this method of supplying plate power. The capacities thus introduced by plate power supply systems as well as those required for tube heaters is sufficient, for the usual range of conditions, to introduce appreciable shunting effect at audio frequencies and an abnormally large shunting effect at even the low radio frequencies. Only at the special codition where the circuit voltage is of such value as to permit the tube cathodes to be connected to the grounded side of the circuit can the shunting effect of the power supply system be eliminated and then only if the voltages selected from the circuit to be proportional to the circuit current do not require amplification of magnitude to operate the modulator circuit.

Prior art methods of power measurement and means of obtaining voltages at ground potential proportional to circuit voltages or currents at a reference potential above ground at audio and radio frequencies therefore are not suitable for general application and do not provide means for measurement of power and current at these frequencies with the ease, accuracy, or range available in methods of measurement of these quantities at commercial power frequencies or in direct current circuits.

It is, therefore, the primary object of my invention to provide a method of making alternating current power measurements over a wide range of frequencies which can be generally applied to all types of circuits and which is capable of accurate operation at elevated frequencies as well as low frequencies below the commercial power frequencies.

Further, in accordance with my invention, power measurements are obtained over a wide frequency range by the use of non-linear resistors connected in a circuit providing a direct indication of power being transferred by the circuit at the point in the circuit to which the system of my invention is applied.

Also, in accordance with my invention, power measurements are made independent of the particular type of load encountered by utilizing substantially any portions of the voltage across that load and the current flowing thereto to actuate the measuring system.

In accordance with another aspect of my invention, the calibration and stability of my power measuring system are assured continuously for long periods of time by the use of circuit components having a high degree of resistance to shock, vibration, aging, temperature, and fluctuations in auxiliary direct power supply voltages to the components and by the absence of gaseous or space conduction in the critical portions of my system.

Another object of my invention is to provide an improved power measuring means having a continuously stable zero reference level achieved by the use of a novel biasing arrangement which is independent of the voltages and currents being measured.

A still further object of my invention is to utilize novel biasing means in electrical measuring circuits to obtain a stable zero reference at a predetermined level of operation.

In accordance with still another aspect of my invention, use of my power and current measuring system is facilitated by the use of direct reading conventional indicating instruments which are less limited as to inherent sensitivity and fragility than those used in previous power and current measuring methods.

In accordance with a further aspect of my invention the indication of power is provided in a low impedance circuit one side of which can be at ground potential or the output of which can be translated to a direct voltage particularly adaptable for use with indicating instruments remotely located with respect to the circuit in which power is being measured.

Further, in accordance with my invention the real and reactive power load on the circuit resulting from the application of my system to this circuit is made very small by the use of indicating circuits and circuit arrangements having capacity to ground made very low by using a high frequency energy source making possible the transfer of this energy by low capacitance magnetic coupling.

In accordance with yet another aspect of my invention a practically unlimited range of power measurements is achieved with my measuring circuit by the use of tapped resistors or transformers arranged for convenient adjustment and accurate calibration and thus it is capable of application to circuits whose voltage or current may vary over extremely wide limits.

Yet another aspect of my invention provides for the measurement of alternating currents over a wide range of values and at frequencies of a wide range by use of conventional indicating instruments at ground potential even though these currents be flowing in conductors at potentials above ground.

Another aspect of my invention provides a means by the use of non-linear resistors for the multiplication of two alternating voltages of the same frequency and the further multiplication of their product by the cosine of their phase displacement and the production of a direct voltage proportional to the results of this triple multiplication.

My invention also provides for the incorporation in one convenient assembly an instrument capable of simultaneous and continuous measurement of power, current, and voltage and either by calculation or additional instrumentation the production of corresponding values of phase angle reactive power and effective resistance of an electrical load to which my system is applied.

My invention also resides in features of construction, combination and arrangement herein described or disclosed whereby my power, current, or voltage measuring circuits may be constructed utilizing standard low-cost resistors, electron tubes, inductors, capacitors, meters and other circuit components which enables the complete device to be readily and economically constructed and to possess such characteristics of ruggedness, utility, permanence and stability of calibration as to make its use in extremes of surroundings practical.

While my invention as described herein is applied to the particular case of power measurements from very low audio up into the radio frequencies it will be evident to those skilled in the art that the principles expressed herein may be applied to other applications, including in particular: power management at low frequencies and low power levels; reproduction of signals where loading due to the reproducing circuits is to be minimized; means of changing the potential reference of signals from one potential to another, and particularly to ground; means of providing this signal not only for operating indicating instruments but for the control of other devices such as relays, tubes, and other control apparatus as a function of the power, current, or voltage or any combination thereof existing in a circuit or as a function of the product of two voltages multiplied by the cosine of their angular displacement.

Referring to the drawings.

Figure 1:
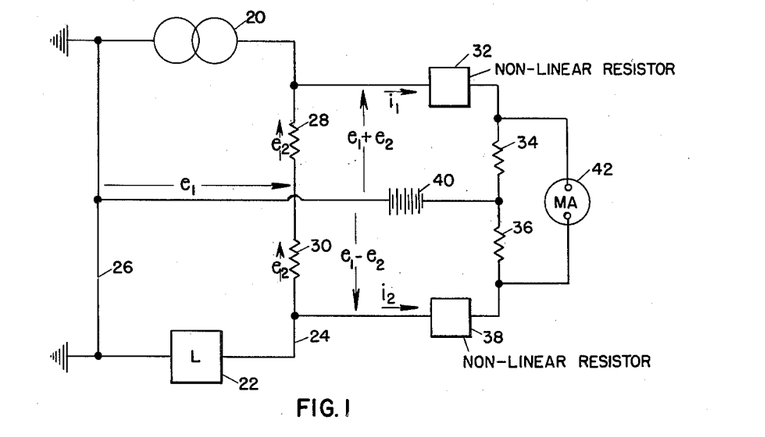
Figure 1 is a simplified schematic diagram illustrating the principle of power measurement employing non-linear resistors.

Figure 1 is a simplified schematic diagram showing the use of non-linear resistors in a power indicating circuit. In this figure, the generator 20 applies voltage to the load 22 through a circuit having an ungrounded line 24 and a grounded line 26. In series with the ungrounded line are resistors 28 and 30 which produce a voltage drop proportional to the current in that line. Shunted across resistors 28 and 30 are a non-linear resistor 32, resistors 34 and 36 and a second non-linear resistor 38. A direct bias voltage source 40 is connected from the center point of resistors 34 and 36 to ground. Placed across the outer points of resistors 34 and 36 is an indicating instrument 42 which indicates the average value of the difference of the currents flowing in resistors 34 and 36.

The resistor pairs 28 and 30, 32 and 38, and 34 and 36 are preferably made up of two units per pair, each unit of each pair having the same resistance characteristic as the other unit of that pair. The voltages appearing across the circuit at various points are indicated in Figure 1. It will be shown in a mathematical analysis appearing later in this specification that with the circuit as shown and using non-linear resistors 32 and 38 so constructed as to pass current in proportion to the square of the applied voltage that the indicating instrument 42 will be deflected in accordance with the power drawn by the load.

In practice, it is desirable in the interest of obtaining the best accuracy of indication of circuit power by indicating instrument 42, to select ohmic values of resistors 34 and 36 appreciably smaller than the resistance of non-linear resistors 32 and 38 at their direct voltage bias points. This is desirable since the currents in resistors 34 and 36 should be substantially determined by non-linear resistors 32 and 38 and applied voltages $e_1+e_2$ and $e_1-e_2$ respectively. In practice, values of resistors 34 and 36 approximate 100 ohms and non-linear resistors 32 and 38 are each about 3000 ohms at the operating direct bias voltages. These values are cited to indicate suitable values for a design found by actual trial to give excellent accuracy of indication of indicating instrument 42 of circuit power. In designing the circuit of Figure 1 for other circuit applications it is adequate to proportion resistors 34 and 36 equal to each other, the characteristic of non-linear resistors 32 and 38 equal to each other and the ohmic value of either resistor 34 or 36 equal to a few percent of the resistance of the non-linear resistors 32 or 38 at their operating direct bias voltage. Furthermore, this direct bias voltage need not exceed the peak value of the sum of voltage $e_1+e_2$ since this is the larger of the two voltages applied to either of the non-linear resistors and because the bias voltage is necessary only to compel the alternating voltages used to excite the non-linear resistors always to operate over their characteristics above their zero points. From this consideration and from the known characteristics of the non-linear resistors their resistance at the bias point may be readily determined from which suitable values of resistance may be selected for resistors 34 and 36 in accordance with previously stated considerations.

Figure 2:
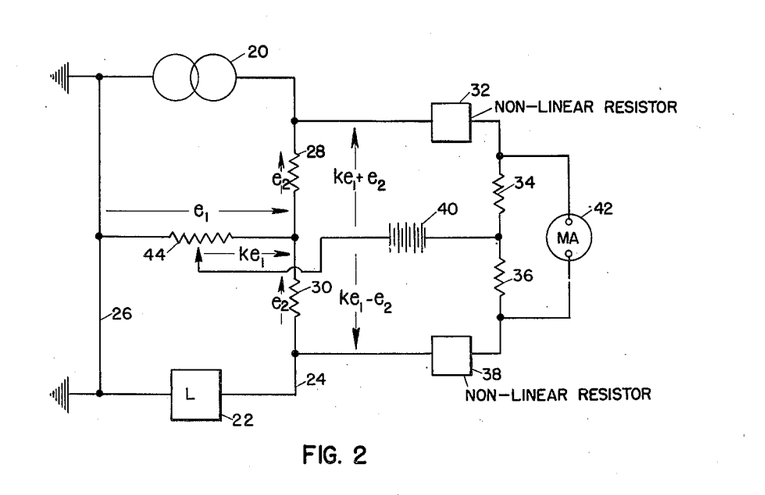
Figure 2 is a schematic diagram showing a modification of Figure 1 illustrating the use of a potentiometer to obtain a voltage proportional to load voltage.

Figure 2 shows a simplified arrangement adapted for use where the load voltage is greater than that encountered in applications suitable for the circuit of Figure 1. In the circuit of Figure 2 potentiometer 44 is added to enable any desired portion of the line voltage to be used for purposes of measurement. In this way it is possible for the voltage signal, $ke_1$, to be approximately the same order of magnitude as the current signal, $e_2$, produced by the voltage drop through resistor 28 or resistor 30, thereby achieving maximum accuracy of the complete system.

Figure 3:
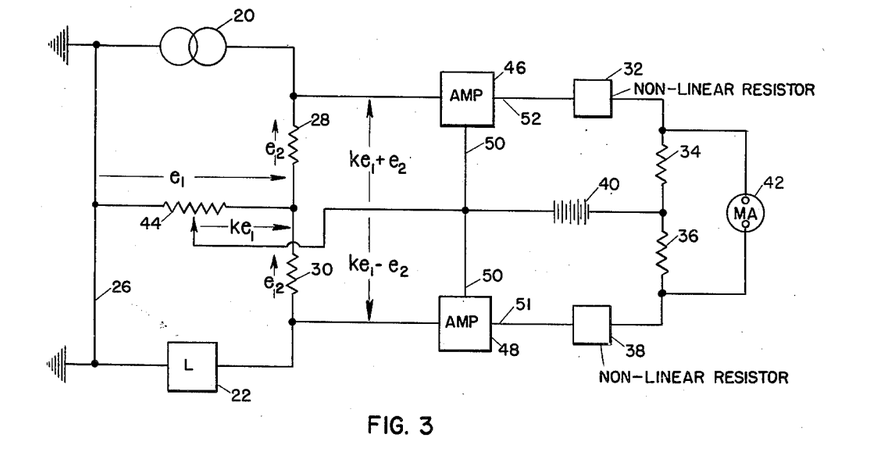
Figure 3 shows a modification of the circuit shown in Figure 2 including the addition of amplifiers to amplify the voltages proportional to the circuit voltage and the current signals.

In Figure 3 is shown a further modification and improvement of the circuit of Figure 2. In order to reduce the voltage drop resulting from the use of resistors 28 and 30 in series with the line it is, of course, desirable that the value of these resistances required for effective operation of the measuring system be kept as low as possible. This may be accomplished by producing relatively small voltage drops across these resistors and amplifying these voltages by means of amplifiers 46 and 48 to values suitable for the system. A direct current path must be provided in the output circuit of amplifiers 46 and 48 across terminals 52 and 50 and across terminals 51 and 50 respectively to conduct the direct current resulting from the direct voltage bias source 40 which must flow through the non-linear resistors 32 and 38 for proper operation of the device in accordance with the previously stated considerations.

Figure 4:
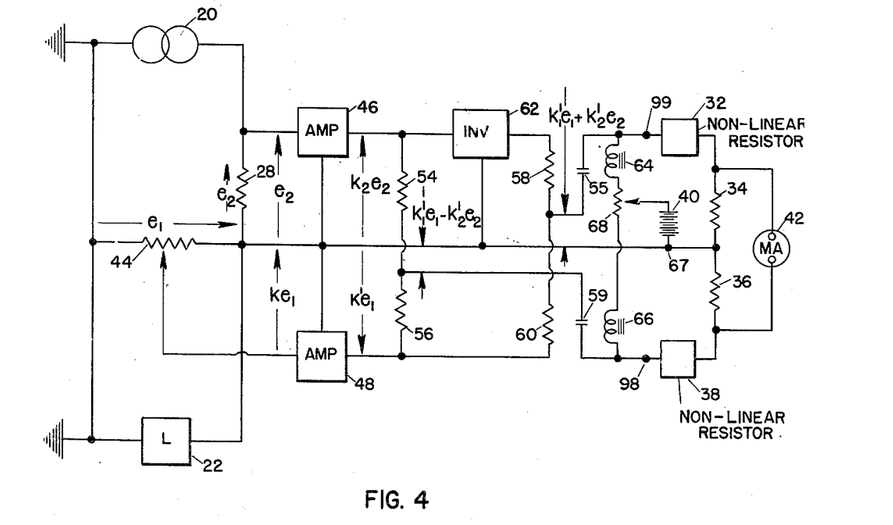
Figure 4 is a modification of the circuit shown in Figure 3 showing the use of separate amplifiers for the voltage and current produced signals, an inverter, and an auxiliary path for the non-linear resistor biasing currents.

Figure 4 is a further modification of the circuit disclosed in Figure 3. In this circuit the amplifiers 46 and 48 feed into resistors 54 and 56 respectively to produce a voltage which is proportional to the sum of the output voltages produced by amplifiers 46 and 48. In addition, the voltage produced at the output of amplifier 46 is inverted in phase and combined with the output signal of amplifier 48 across resistors 58 and 60, to produce a voltage which is proportional to the difference between the output voltages of amplifiers 46 and 48. The voltage sum is applied to terminal 99 of the non-linear resistor 32 while the voltage difference is applied to terminal 98 of the non-linear resistor 38. In order to make it unnecessary for the biasing current from the bias source 40 to flow through the amplifiers or resistors 54, 56, 58, and 60; low resistance, high reactance, paths are provided for shunting the bias currents between points 67 and 99 and between 67 and 98. The shunting circuit consists of the inductances 64 and 66 in series with a balancing resistor 68 for equalizing the bias current flowing through resistors 32 and 38 respectively. Capacitors 55 and 59 prevent the flow of direct current through the voltage sum and difference networks, resistors 54, 56, 58 and 60.

This circuit has the advantage that only one series line resistor need be used and further that the bias current is kept separate from the currents flowing through the amplifier and resistor networks. This increases the stability of indication by utilizing a well regulated independent direct voltage bias source independent of other circuits. Such isolation of the bias current is particularly applicable to the circuit disclosed in Figure 5 and will be discussed more completely in connection with that circuit.

It is usually necessary for the power measuring apparatus to be excited by a voltage obtained from the ungrounded line. This results in substantial capacitive loading of the ungrounded line when the measuring device is used at audio frequencies or above. Such capacitive coupling occurs because of the capacitance to ground of the measuring equipment itself, or, more important, the capacity to ground existing in power supply equipment used to supply direct bias voltage to the circuit and to furnish the plate and filament voltages for the amplifiers used in this system.

In order to avoid capacitive coupling to ground it is necessary to capacitively and conductively isolate the amplifier and power supply equipment from the ungrounded side of the line supplying the load.

Figure 5:
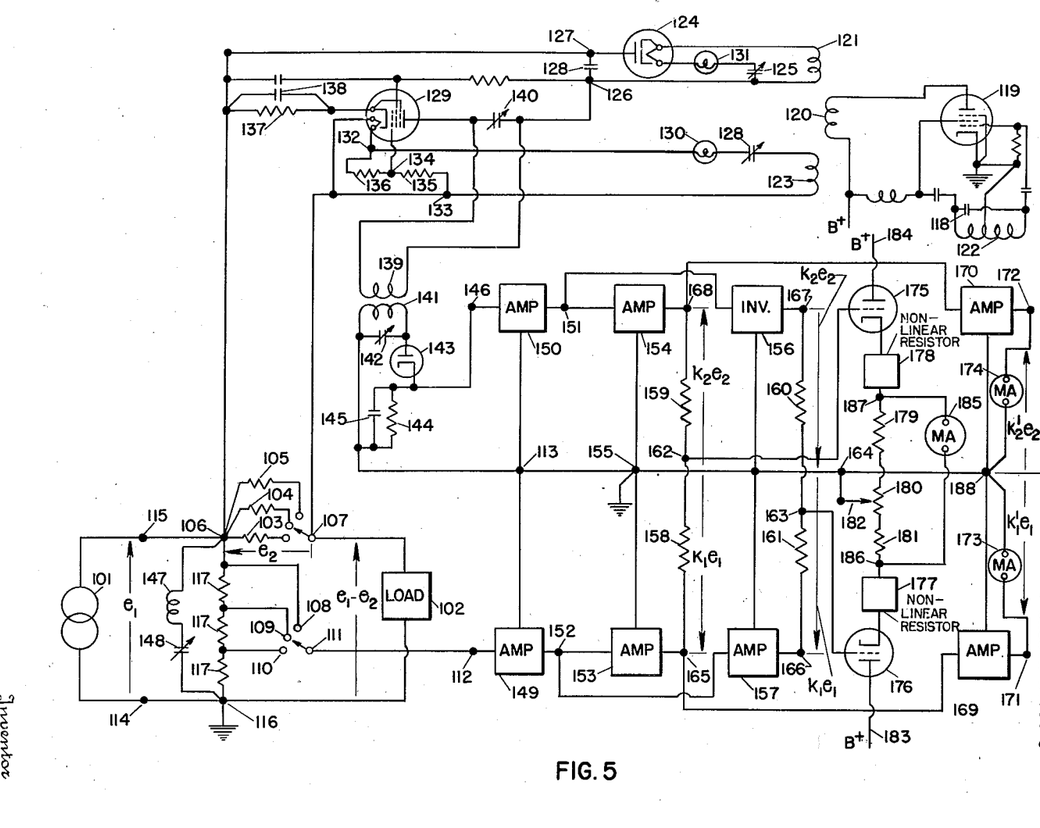
Figure 5 is a simplified schematic diagram showing the use of a modulator and demodulator together with the use of indicating meters to provide simultaneous readings of power, current, and voltage.

In accordance with my invention, this is accomplished as shown in Figure 5. A source of alternating current 101 supplies power to load 102. It is desired to measure the current and power supplied to load 102 and the voltage across the terminals of load 102 over a wide range of voltages, currents, and frequencies. In the connecting wiring, arrangement is made to insert and select one of a number of series resistors 103, 104, or 105, for example. These resistors are of low ohmic value and develop a small voltage proportional to the current flowing through any one resistor when connected across terminals 106 and 107. A high resistance 117 is connected across the lines and provided with taps represented by points 108, 109, 110. The entire voltage between lines or a portion thereof can be selected by appropriately positioning switch arm 111. This selected voltage appears across points 112 and 113 which is either equal to or a selected fixed fraction of voltage $e_1$ appearing across the terminals 114 and 115. The voltage $e_2$ appearing across terminals 106 and 107 is, by selection of resistors such as 103, 104, and 105, a very small fraction of $e_1$. The voltage appearing across the load at terminals 107 and 116 is $e_1 - e_2$ and which is, therefore, only very slightly different in value from $e_1$. Resistance 117 is of sufficiently high ohmic value that it represents only a very minute loading across the generator terminals 114 and 115 which is insignificant compared to the loading of the generator caused by the load 102 across terminals 107 and 116.

In order to utilize the voltages $e_1$ and $e_2$ for the purposes of this invention, it is necessary to bring voltage $e_2$ or a voltage proportional to $e_2$ to ground potential. That is, it is necessary that the current proportional voltage across point 106 to point 107 be effectively brought to ground potential in order that the minute voltage $e_2$ can be amplified and suitably combined with $e_1$ or a voltage proportional to $e_1$ to measure power or suitably amplified to measure current. Unless this feature is provided it is not practically feasible to amplify voltage $e_2$ with available amplifier techniques to increase its magnitude sufficiently to operate available indicating instruments because, for circuits operating at frequencies much above commercial power frequencies, the use of amplifiers and their associated power supplies results in placing a large shunt capacity and a consequent capacitive reactance diminishing with frequency and an appreciably low shunt resistance across terminals 114 and 115 of the generator. Furthermore, the values of voltages proportional to $e_1$ and $e_2$ ultimately used to operate the wattmeter element of this invention should be of the same order of magnitude to provide satisfactory operation of this apparatus. In many of the circuit to be measured in practice in audio and radio frequency work it is necessary to attenuate voltage $e_1$ and amplify voltage $e_2$ prior to their combination to effect the measurement of the wattage consumed by load 102. Since other portions of this invention are to supply voltages proportional to $e_1-e_2$ and $e_1+e_2$ a feature of this circuit provides for obtaining these voltages without the addition of another set of series resistors similar to resistors 103, 104, and 105, placed in the line between the generator 101 and point 115. For minimum circuit disturbance it is, of course, desirable to keep the number of resistors and the values of resistance inserted in the circuit being measured to a minimum.

The method of providing a voltage at ground potential proportional to $e_2$ is effected in my invention by the use of an oscillator, a modulator, and a demodulator. A tuned circuit consisting of inductor 122 and capacitor 118 is tuned to operate at a frequency several orders of magnitude higher than the frequency of the circuit to which my invention is to be applied to measure power, current, or phase angle. While the ratios between these frequencies are not critical, they are relatively well defined in accordance with good design practice in the design of the modulator. The tuned circuit formed by circuit elements 122 and 118 used in conjunction with tube 119 forms an oscillator which provides a voltage of fixed frequency across inductor 120. The oscillator circuit used to supply inductor 120 is representative of a suitable oscillator that may be used for this purpose but it is not restricted to the specific type of oscillator shown.

Inductor 121 is coupled magnetically to inductor 120. Across inductor 121 the filament of tube 124 and capacitor 125 are so proportioned that they resonate at the frequency of the energy applied magnetically by inductor 120. This feature provides a relatively large current through the filament of tube 124 and at the same time a relatively large voltage across inductor 121. Tube 124 is a rectifier tube which rectifies the voltage appearing across inductor 121 which in turn provides, in conjunction with capacitor 128, an essentially direct voltage across terminals 126 and 127. This direct voltage is relatively large by virtue of the high alternating voltage at the resonance point of inductor 121 and capacitor 125. By this means, therefore, a relatively large direct voltage and a direct current are provided by a circuit which has a very small capacity to ground. The capacity to ground results from the capacity between inductors 121 and 120 and the capacity between the wiring such as points 126 and 127 and tube 124 to ground. These capacities however may be made exceedingly small by proper design, through the use of a high frequency oscillator to supply inductor 120, and by the use of proper spacing of small tubes and components such as tubes 124, capacitors 125 and 128 etc.

Inductor 123 is also magnetically coupled to inductor 120 and tuned to resonance by capacitor 128. The filament of tube 129 is connected in series with inductor 123 and capacitor 128 and is heated by the current flowing in the circuit thus formed as was the case for the filament of tube 124. The correct magnitude of current thru the filament of tubes 124 and 129 is measured by use of incandescent lamps 130 and 131 by measuring their brilliancy as compared with the brilliancy obtained when similar lamps are operated on a conveniently measured direct current or low frequency alternating current circuit. Once these filament circuits are adjusted no further adjustment is necessary.

Tube 129, shown as a pentode but not necessarily required to be such for successful operation of this circuit, is utilized as a grid-controlled modulator though other types of modulation could be used for this purpose. For grid modulation of tube 129 the high frequency voltage is supplied by resistors 135 and 136 connected across the filament circuit of tube 129 at points 132 and 133 with the control element of tube 129 connected to point 134. Resistors 135 and 136 are of such relative value as to provide a suitable magnitude of high frequency voltage for the excitation of tube 129. Higher voltages than that appearing across terminals 132 and 133 may be obtained by a resistor voltage divider connected across the terminals of inductor 123. The signal frequency voltage for operation of tube 129 is supplied by the voltage appearing across the series resistors 103, 104, or 105. Thus by providing the control element of tube 129 with a signal frequency voltage and a carrier frequency voltage as described and by utilizing resistor 137 and capacitor 138 to provide suitable bias voltage for tube 129, it is possible to excite the tuned circuit composed of inductor 139 and capacitor 140, tuned to the oscillator frequency, in a manner such as to cause a high frequency voltage modulated at the frequency of and in proportion to the voltage $e_2$ to appear across the terminals of inductor 139. Additional stability may be provided to this circuit by employing negative feedback around tube 129 from inductor 139 to its exciting circuit. A source of direct current supply to tube 129 is provided by tube 124, capacitors 125 and 128 and inductor 121 whose operation has been previously described.

Inductor 141 is magnetically coupled to inductor 139. Inductor 141 is tuned to resonance at the oscillator frequency by capacitor 142. Coupling between inductors 139 and 141 is adjusted so as to provide a constant pass band slightly in excess of twice the maximum frequency of the voltage $e_2$. The voltage appearing across inductor 141 is detected or demodulated by a suitable demodulator shown in Figure 5 as a diode detector 143. The known properties of tube 143 and the integrating circuit formed by the parallel combination of resistor 144 and capacitor 145 produce an alternating voltage proportional to the modulating voltage used to excite tube 129. Therefore, the alternating voltage appearing across terminals 146 and 113 is of the same frequency or frequencies as voltage $e_2$ appearing across terminals 106 and 107 and proportional to voltage $e_2$. By the means just described it is obvious that a means has been provided to bring voltage $e_2$ to ground potential without any interposed voltage such as $e_1$ or a portion thereof and in a manner independent of voltage $e_1$. Furthermore, by appropriate design the capacity to ground of the modulator tube 129, its D.-C. power supply system, its filament and control element excitations, and the associated wiring resistors, and inductors may be made sufficiently small as to offer an inappreciable effect of capacity at high frequencies of $e_1$. In order to prevent an appreciable voltage at oscillator frequency from appearing across resistor 117 the circuit tuned to the oscillator frequency and composed of inductor 147 and capacitor 148 connected across the resistor 117 is utilized to bring point 106 to substantially ground potential as far as oscillator frequency voltage is concerned and to prevent currents and voltages of oscillator frequency from circulating in the circuit under measurement such as generator 101 and load 102. A filter tuned to reject oscillator frequency voltages may be inserted between points 111, 112, and 116 to prevent these voltages from appearing across points 112 and 113. Since the oscillator frequency is several orders of magnitude higher than the highest frequency of voltage $e_1$, the tuned circuit composed of inductor 147 and capacitor 148 offers very high shunt impedance at the maximum frequency of voltage $e_1$. This impedance may be further increased by using a higher ratio of the oscillator frequency to the frequency of voltage $e_1$.

Amplifiers 149 and 150 are capable of providing substantially constant amplification over the entire frequency range of the circuit whose power, voltage, and current are to be measured. These amplifiers may employ inverse feedback or other means of maintaining constant amplification. The function of these amplifiers is solely to increase the magnitude of the voltages presented to their input terminals. Amplifier 149 amplifies only the voltage selected by switch arm 111 from resistor 117 which thus appears across terminals 112 and 113. This voltage, increased in amplitude by amplifier 149, appears across terminals 152 and 155 and is directly proportional to voltage $e_1$ appearing across terminals 114 and 115. Amplifier 150 amplifies only the alternating voltage appearing across resistor 144. This voltage, increased in amplitude by amplifier 150, appears across terminals 151 and 155 and is directly proportional to the voltage appearing across terminals 106 and 107 which is proportional to the current flowing through the resistor connected between terminals 106 and 107. The voltage appearing across terminals 151 and 155 is directly proportional, therefore, to the current flowing into load 102.

The voltage appearing across terminals 152 and 155 excites amplifiers 153 and 157 which are designed to possess a low internal impedance. These amplifiers may be conventional cathode-coupled amplifiers. The voltages appearing at the outputs of these amplifiers across terminals 155 and 165 across terminals 155 and 166 are $k_1 e_1$ where $e_1$ is the voltage appearing across terminals 114 and 115 and $k_1$ is the linear, substantially arithmetic, factor of proportionality dependent on the position of switch arm 111 and the amplification factor of amplifiers 149 and 153 or amplifiers 149 and 157. The two amplifiers 153 and 157 provide two separate sources of voltage $k_1 e_1$ in order to prevent any interaction of these voltages as they excite further portions of this device.

The voltage appearing across terminals 151 and 155 is amplified by amplifier 154 designed to possess a low internal impedance. This amplifier may be a conventional cathode-coupled amplifier having constant amplification and low phase shift over a large range of frequency. The ratio of output to input voltages of this amplifier may therefore be described by a substantially constant arithmetic factor linearly relating these voltages. The voltage appearing at the output of this amplifier across terminals 155 and 168 is $k_2 e_2$ where $e_2$ is the voltage appearing across terminals 106 and 107 and $k_2$ is the constant, substantially arithmetic, factor of proportionality dependent on the ohmic value of resistor 103, 104 or 105 and the amplification factor of modulator tube 129, and its exciting and output circuits and the amplification factor of amplifiers 150 and 154.

Amplifier 156 is excited by the same voltage as is supplied to amplifier 154. The output voltage of this amplifier appears across terminals 155 and 167. Amplifier 156 is designed to have the same amplification factor as amplifier 154 but to act as a phase inverter. Thus the voltage appearing across terminals 155 and 167 is $-k_2 e_2$. Amplifier 156 is designed to have low internal impedance.

The voltage $k_1 e_1$ appearing across terminals 155 and 165 is a direct measure of the voltage $e_1$. The input terminals of amplifier 169 are connected to terminals 155 and 165 and produce an output voltage $k_1' e_1$ across terminals 171 and 188, which is read directly by a suitable meter 173 connected across terminals 171 and 188. The amplifier 169 provides constant, stable amplification effected by such a means as negative feedback and provides an amplification $k_1'/k_1$ sufficient to operate meter 173 which may be a conventional D.-C. ammeter operated through a suitable rectifier by voltage $k_1' e_1$. The meter 173, because of the known and definite relation between $k_1' e_1$ and $e_1$ may be calibrated to read directly in terms of $e_1$. Since $k_1$ can be made a constant arithmetic quantity the calibration of meter 173 may be made a linear function of $e_1$ and subject to simple changes in range by varying the position of switch arm 111.

The voltage $k_2 e_2$ appearing across terminals 155 and 168 is a direct measure of the current flowing through a resistor, such as resistor 103, 104 or 105, connected between terminals 106 and 107 and thus $k_2 e_2$ is proportional to the current flowing into the load 102. The input terminals of amplifier 170 are connected to terminals 155 and 168 and produce an output voltage $k_2' e_2$ across terminals 172 and 188 which is read directly by a suitable meter 174 connected across terminals 172 and 188. The amplifier 170 provides a constant stable amplification effected by such means as negative feedback and provides an amplification $k_2'/k_2$ sufficient to operate meter 174 which may be a conventional D.-C. ammeter operated through a suitable rectifier by voltage $k_2' e_2$. The meter 174, because of the known and definite relation between $k_2' e_2$ and $e_2$ and the current causing $e_2$ to appear across terminals 106 and 107, may be calibrated to read directly in terms of this current. Since $k_2'$ can be made a constant arithmetic quantity the calibration of meter 174 may be made a constant function of the current flowing into load 102 and subject to simple changes in range by selection of the ohmic value of resistors 103, 104 or 105 connected between terminals 106 and 107.

It is evident that meter 173 and its associated amplifiers and circuit elements are separate from and independent of meter 174 and its associated amplifiers and circuit elements. Therefore, these two systems may be used together, as shown in Figure 1, or they may be used separately. Furthermore, the current and voltage measuring systems described may be used to excite various forms of phase angle meters, which are well known, to provide a means of measuring the relative phase angle between the voltage $e_1$ across load 102 and the current supplied to load 102 by an alternating current source such as generator 101.

In order to provide a means of measuring circuit power it is necessary to provide a voltage proportional to $k_1e_1-k_2e_2$ and another voltage proportional to $k_1e_1+k_2e_2$. These voltages are provided by resistors 158, 159, 160, and 161 and the voltages $k_2e_2$, $-k_2e_2$, $k_1e_1$ and $-k_1e_1$ existing respectively at the output terminals of amplifiers 154, 156, 153 and 157. Writing the voltage equations around terminals 155, 163, 162, 165, and 155 and across resistors 159 and 158:

$$k_2e_2-e_{159}-e_{158}-k_1e_1=0$$

and $$k_2e_2-e_{159}=e_{155,162}$$

(the voltage between points 155 and 162). Resistors 159 and 158 may be equal in ohmic value or they may bear some fixed relation to each other. This determines the relative value of $e_{159}$ with respect to $e_{158}$. These selected values are determined by design requirements. If, for purposes of illustration, $e_{159}$ is equal to $e_{158}$ a solution of the two equations shows that $$e_{155,162}=(\tfrac{1}{2})(k_1e_1+k_2e_2)$$

This voltage appears across terminals 162 and 164.

In a similar manner writing voltages around terminals 164, 167, 163, 166, and 164 and across resistors 160 and 161 will demonstrate that the voltage appearing across terminals 163 and 164 is $(\tfrac{1}{2})(k_1e_1-k_2e_2)$.

Tube 176 is connected so that its control element is excited by the voltage $\tfrac{1}{2}(k_1e_1-k_2e_2)$ appearing across terminals 163 and 164. Tube 175 is connected so that its control element is excited by voltage $\tfrac{1}{2}(k_1e_1+k_2e_2)$ appearing across terminals 162 and 164. In the cathodes of tubes 175 and 176 linear resistors 179, 180, and 181 are connected in series. The sliding arm 182 contacting resistor 180 is connected to terminal 164. A source of direct current is supplied to terminals 183 and 184 connected together and to terminal 164 in such a manner that terminals 183 and 184 are at the same constant positive potential with respect to terminal 164. Tubes 175 and 176 are shown as triodes they may, however, be other tubes for devices which may be suitably controlled by the exciting voltages appearing across terminals 162 and 164 and terminals 163 and 164. Across terminals 186 and 187 a sensitive D.-C. ammeter 185 is connected to read the difference in the currents flowing through resistors 179 and 181. Arm 182 is utilized to suitably divide resistor 180 electrically to effect a zero flow of current through meter 185 when no excitation is present at the control elements of tubes 175 and 176. Resistors 177 and 178 are non-linear. The square of the voltage produced across these resistors is proportional of the current flowing through them, that is, $i=ae^2$ where $i$ is the current through one of these resistors, $e$ is the voltage across its terminals and $a$ is the constant necessary to equate $e^2$ to $i$. Resistors with this property are available, for example a resistor possessing this characteristic is manufactured commercially from silicon carbide (thyrite).

Figure 6:
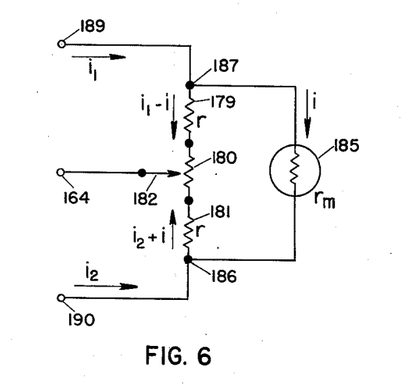
Figure 6 is a detailed view of a portion of the circuit shown in Figure 5 to illustrate the use of resistors to cause a meter to read the difference of two currents.

In Figure 6 D.-C. ammeter 185 with internal resistance $r_m$ is connected across resistors 179, 180, and 181 at terminals 186 and 187. Resistor 180 is provided with a variable tap, arm 182, utilized to adjust the resistance between arm 182 and terminal 187 to equal the resistance between arm 182 and terminal 186. Each of these resistances is denoted $r$. Through terminal 189 a current $i_1$ flows toward terminal 187 and through terminal 190 a current $i_2$ flows toward terminal 186. The current through meter 185 is $i$ flowing from terminal 187 to terminal 186. The current flowing through resistor 179 is $i_1-i$ flowing toward arm 182. The current through resistor 181 is $i_2+i$ flowing toward arm 182. Writing the voltage equation around the circuit through terminal 186, arm 182, terminal 187 and meter 185 produces $$(i_1-i)r-ir_m-(i_2+i)r=0$$

The solution of this equation shows that $i=r(i_1-i_2)/(2r+r_m)$. Therefore, the reading produced on meter 185 is proportional to the difference between currents $i_1$ and $i_2$. The factor of proportionality is $r/(2r+r_m)$. While it has been stated that the resistances from arm 182 to terminal 187 and from arm 182 to terminal 186 must be equal this is necessary only for the most precise indications of the difference between currents $i_1$ and $i_2$. Small differences in the values of these two resistances may be tolerated in practice without materially affecting the utility of the circuit for adequately measuring the differences between currents $i_1$ and $i_2$.

Figure 7:
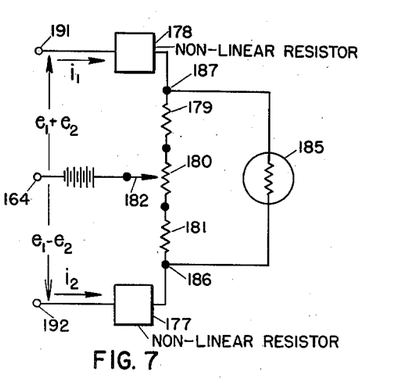
Figure 7 is a further detailed view showing the circuit of Figure 6 with the adidtion of non-linear resistors and a source of direct biasing voltage.

In Figure 7 the same circuit as in Figure 6 is utilized except that non-linear resistances 178 and 177, which may have the characteristic $i=ae^2$ have been added. The circuit shown in Figure 7 is excited by voltage $e_1+e_2$ applied between terminals 164 and 191 and by voltage $e_1-e_2$ applied between terminals 164 and 192. These voltages may be direct and/or alternating and of the same frequencies or of the same fundamental frequencies plus harmonics of these frequencies. The circuit shown in Figure 7 is capable of measuring power in a circuit and indicating the value of this power directly on meter 185. To accomplish this end it is necessary that the voltage $e^1$ be equal to or proportional to the circuit voltage such as $e_1$ between terminals 114 and 115 in Figure 5 and that voltage $e_2$ be proportional to the circuit current such as the current flowing between terminals 106 and 107 in Figure 5 and that the characteristics of the non-linear resistors 177 and 178 be such as to produce a product of $e_1$, $e_2$ and the cosine of their phase angle.

The elements of the circuit of Figure 7 are so proportioned that, over the designed range of operation, the resistances of resistors 177 and 178 are appreciably larger than the parallel combination of resistance $r_m$ of meter 185 in series with the resistance between terminal 186 and arm 182 and the resistance between terminal 187 and arm 182. The currents $i_1$ and $i_2$, therefore, are substantially determined by the resistances of non-linear resistors 178 and 177 respectively. With this provision the voltages across resistors 177 and 178 are substantially equal to $e_1+e_2$ and $e_1-e_2$ respectively. Resistors 177 and 178 may have a characteristic defined by the relation $i=ae^2$ as previously expressed in the description of these resistors. Since $e$ is the voltage across the resistors in the expression of their characteristics, and by reason of the design considerations already expressed, $i_1=a(e_1+e_2)^2$ and $$i_2=a(e_1-e_2)^2$$

Substituting these values into the expression derived for $i$ in terms of $i_1$ and $i_2$ derived in the discussion of Figure 6 yields $$i = \frac{ra}{2r+r_m}(e_1{}^2 + 2e_1e_2 + e_2{}^2 - e_1{}^2 + 2e_1e_2 - e_2{}^2)$$

from which $i = 4rae_1e_2/(2r+r_m)$. As already stated, voltages $e_1$ and $e_2$ may be alternating voltages. For simplicity and neglecting harmonics which these voltages may contain yet for which the circuit of Figure 7 is valid, voltage $e_1 = k_aE \cos \omega t$ and voltage $e_2 = k_b I \cos (\omega t + \phi)$ where $k_a$ and $k_b$ are linear, arithmetic factors of proportionality. Substituting these values of $e_1$ and $e_2$ into the expression for $i$ produces $$i = \frac{4rak_ak_b}{2r+r_m} EI \cos \omega t \cos (\omega t - \phi) \quad (1)$$

or $i = K \cos \omega t \cos (\omega t + \phi)$, where $$K = \frac{4EIrak_ak_b}{2r+r_m}$$

Since meter 185 is a D.-C. ammeter it will respond only to the average value of $i$. The average of current $i$ is defined mathematically by $$I_{dc} = \frac{1}{T} \int_0^T i \, dt \quad (2)$$

The period $T$ for an alternating current wave may be taken as $\pi$. Therefore, $$I_{dc} = \frac{1}{\pi} \int_0^\pi i \, d(\omega t) \quad (3)$$

Substituting the value of $i$ in this equation:

$$I_{dc} = \frac{K}{\pi} \int_0^\pi \cos \omega t \cos (\omega t + \phi) d(\omega t) \quad (4)$$

The solution of this equation is:

$$I_{dc} = \frac{K}{\pi} \cos \phi \left[ \frac{\omega t}{2} + \frac{\sin 2\omega t}{4} \right]_0^\pi - \frac{K}{4\pi} \sin \phi [1 - \cos 2\omega t]_0^\pi \quad (5)$$

This reduces, upon substitution of the limits, to $$\left[ \frac{K}{2} \right] \cos \phi$$

Substituting the previously designated value for K yields:

$$I_{dc} = \frac{2rak_ak_b}{2r+r_m} EI \cos \phi \quad (6)$$

From this expression it is evident, since the meter 185 reads directly this value of $I_{dc}$, that the circuit of Figure 7 is capable of reading wattages directly when excited in the manner previously defined. It is not necessary that the circuit of Figure 7 be used in conjunction with electronic discharge devices or tubes, or that it be composed of such equipments. The derivation of the properties of this circuit is based on the use of circuit elements with solid conduction rather than the use of gaseous conduction particularly in the non-linear elements 177 and 178. Furthermore, an element similar to either element 177 or 178 may be utilized with amplifiers 169 or 170 or with meter 185 to provide other than linear deflections of meters 173 and 174 respectively to provide desired scale distributions other than linear on these meters. The scale of these meters may, for example, be made expanded on either end by proper choice of the $i$ versus $e$ characteristics through suitable selection of the characteristics of the non-linear elements. This feature may be applied to other electrical meters such as watt, volt or ammeters of either conventional magnetic or electronic types used either with or without amplifiers or electric discharge devices.

In practice, for the circuit of Figure 7, it will be necessary to supply a suitable direct voltage bias to effect a suitable operating point on the $i$ versus $e$ characteristic of elements 177 and 178. This may be effected by a common direct voltage bias inserted in the line between terminal 164 and arm 182 or it may be accomplished by the insertion of direct bias voltages between terminal 191 and element 178 and terminal 192 and element 177 respectively.

In Figure 5 tubes 175 and 176 provide the means of supplying both the exciting voltages proportional to $(e_1+e_2)$ and $(e_1-e_2)$ respectively to the circuit shown in Figure 7. Since the circuit of Figure 7 is connected directly into the cathodes of tubes 175 and 176 a means is also provided for providing a direct voltage bias for elements 177 and 178 by virtue of the direct voltage required for the operation of these tubes. Tubes 175 and 176 are ideally of linear characteristics. Any non-linearity that these tubes may possess in practice is undesirable and does not contribute to the operation of this means of measuring watts or power. The insertion of the circuit of Figure 7 between the cathode of tubes 175 and 176 and terminal 164 allows tubes 175 and 176 to act as cathode coupled or cathode follower amplifiers which present, by virtue of the negative feedback inherently present, a low impedance source of voltages for the excitation of the circuit of Figure 7. This arrangement also minimizes the effective variations in the characteristics of commercially available tubes as well as the non-linearity of these characteristics. These features result in the presentation of excitation voltages to the circuit of Figure 7 as used in Figure 5 substantially directly proportional to the exciting voltages presented to the control elements of tubes 175 and 176.

Arm 182 providing a variable tap on resistor 180 has a purpose other than providing a means of equalizing resistance between arm 182 and terminal 186 and arm 182 and terminal 187 in the circuit of Figure 7 as it is used in the circuit of Figure 5. Variation of the position of arm 182 also increases the bias on tube 175 and reduces the bias on tube 176 or vice versa depending on the direction in which arm 182 is moved. This same effect may be achieved also by the provision and variation of a small direct bias voltage in the control elements of tubes 175 and 176. Both of these means serve to provide a means of adjusting the deflection of meter 185 to zero in the absence of excitation to control elements of tubes 175 and 176.

The circuit of Fig. 7 may be used to measure either direct or alternating current watts or a combination thereof. It may also be used with or without amplifiers to measure these quantities or quantities proportional thereto in a manner such as that explained in Figs. 1, 2, 3 and 4. As the circuit of Fig. 7 is used in Fig. 5 it has been employed to measure alternating current watts as an illustrative and useful example of its employment though its use is not intended to be restricted to this example.

It is, of course, apparent that other various modifications may be made of the circuits and combinations of circuits and circuit elements described herein without departing from my invention. Other types of oscillators such as, for example, crystal controlled oscillators, may be used to excite inductor 120. Inductor 120 may be formed of two separate inductors magnetically and electrostatically shielded from each other and connected in series or parallel, one exciting inductor 121 and the other exciting inductor 123. Tube 124 may be other than a diode as shown in Fig. 5. Furthermore it may be a metallic rectifier or a cold cathode arc discharge device not requiring filament power. Tube 129 and its associated circuit elements utilized to effect the modulating process may operate on other principles of modulation or may be entirely or partially replaced by other tubes, arc discharge devices, rectifiers or other types of circuit elements to effect the modulation process. Tube 143 and its associated circuits and circuit elements utilized to effect the modulation process may utilize other than the diode detector shown in Fig. 5. Multigrid tubes or rectifiers of other types and other types of demodulator circuits may be utilized to provide an output proportional to voltage $e_2$.

Suitable and desirable electrostatic or electromagnetic shielding or combinations thereof may be utilized with inductors 147, 139, 141, 120, 121, 123, and 122 and such other circuit elements or portions of the circuit to minimize or eliminate magnetic or electrostatic coupling or for confining it to desired portions of the circuit or to desired circuit elements. Increased spacing of circuit elements, combinations of circuit elements and associated wiring or the use of insulation with a low capacitive constant may be utilized to diminish the capacity of the modulator and its pertinent associated circuits to ground or to other circuits or circuit elements.

In this description of my invention certain circuit elements have been defined as tubes which have been intended herein to define electric discharge devices. Types of electric discharge devices or tubes different from those above described, yet functionally the equivalent thereof, may be used. Furthermore, to simplify the description of the system illustrated, certain of the tubes shown in Figure 5 have had omitted their filament circuits, likewise the details of circuit arrangements of certain amplifiers have been omitted as have sources of direct current for the operation of certain of the tubes and amplifiers. These ommissions are not pertinent to my invention and sufficient description of its operation is detailed herein to describe its features to those skilled in the art.

Figure 8:
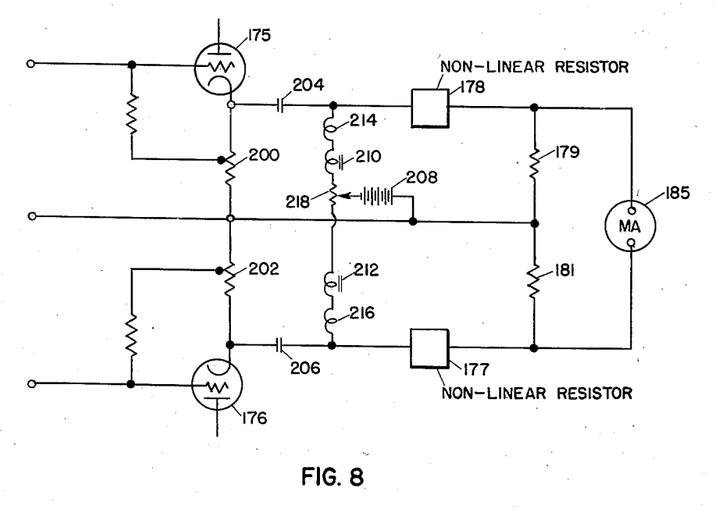
Figure 8 shows a modification of a portion of the circuit shown in Figure 5 including additional circuit components in the wattmeter portion of my device whereby a direct biasing voltage separate from that existing in the driving tubes is provided.

It will be noted that in Figure 5 the cathode currents of tubes 175 and 176 flow through the non-linear resistors 178 and 177 respectively. It has been found that greater stability may be obtained by providing a separate direct voltage biasing source for the non-linear resistors and preventing the flow of cathode current through the non-linear resistors. Means for accomplishing the latter is shown in Figure 8. In this figure, cathode resistors 200 and 202 carry the cathode current. The alternating signal is transferred to the non-linear resistors 177 and 178 through capacitors 206 and 204. These capacitors may be made as large as necessary to provide low reactance paths for very low audio frequencies. A source of direct voltage 208 supplies biasing voltage to the non-linear resistors 178 and 177. A return path for the direct biasing current is provided through inductances 210 and 212 which may, for example, be as large as 50 henries in order to offer high shunt impedance to very low audio frequencies. Also included in this circuit may be radio frequency chokes 214 and 216 to prevent the passage of high frequency currents if the design of inductances 210 and 212 are deficient in this respect. Balance of bias current is obtained by means of center tapped resistor 218 which is adjustable and of a value of about 500 ohms.

Figure 9:
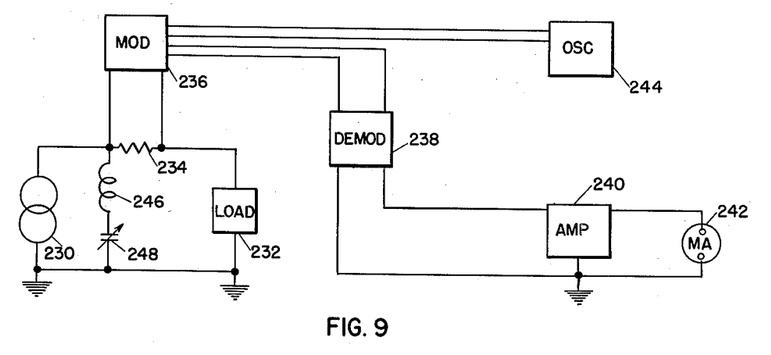
Figure 9 is a modification of my invention particularly adapted to the measurement of current in a high frequency alternating current circuit.

Figure 9 shows another modification of my invention in which the voltage drop across a series resistor is utilized to produce a current indication. Means are provided for preventing capacitive loading of the circuit containing the load. In this figure the generator is indicated by the figure 230 and the load by the figure 232. A voltage drop proportional to load current is developed across resistor 234 fed into modulator 236 demodulated in demodulator 238, amplified in amplifier 240 and indicated by the voltage indicating means 242. An oscillator 244 generates power for providing a carrier frequency to the modulator and for providing any necessary modulator filament supply or rectifier supply for the modulator. A circuit consisting of inductance 246 and capacitance 248 may be included as shown in Figure 9. Capacitance 248 is adjusted to cause the circuit to resonate at carrier frequency to insure that carrier power does not effect the load 232. The operation of the circuit shown in Figure 9 is the same as that shown and described more fully in Figure 5 and it is unnecessary therefore to discuss the circuit in detail.

Figure 10:
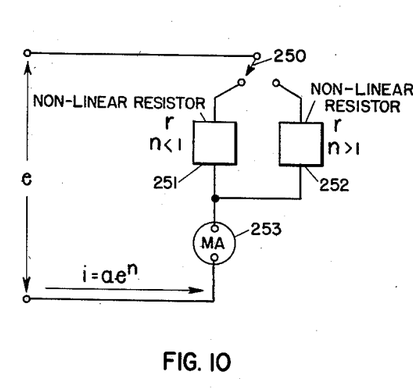
Figure 10 shows the use of auxiliary non-linear resistors to enable the spreading of the upper or lower portion of the scale of the indicating instruments.

If desired non-linear resistors may be inserted in series with the indicating instruments to spread the scale in the upper or lower range as desired. The general expression for current flow through this additional non-linear resistor is given by the expression $i=ae^n$. In order to expand the lower end of the scale a non-linear resistor is used which has a value of $n$ less than 1 while to expand the upper end of the scale a value of $n$ greater than 1 is used. This arrangement is shown in Figure 10 providing a means for selecting scale expansion on either end of the scale by utilizing switch 250 to bring either non-linear resistor 251 or 252 into the circuit in series with meter 253.

Figure 11:
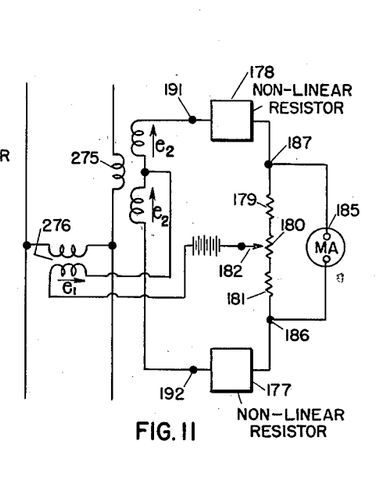
Figure 11 is a simplified circuit diagram illustrating the use of transformers in my power measuring circuit.

Figure 11 illustrates the use of the circuit described in Figure 7 utilizing transformers as a means of connecting this circuit to the circuit in which power is to be measured. The primary of transformer 276 is connected across the terminals of the circuit under measurement to produce across the secondary of transformer 276 the voltage $e_1$ proportional to the primary voltage impressed on this transformer. The primary of transformer 275 is connected in series with one line of the circuit under measurement and, by means of the centertapped secondary of transformer 275, produces two voltages proportional to the current in this line each of which voltage is designated as $e_2$ in Figure 11. The secondary of transformers 275 has its center point connected to one terminal of the secondary of transformer 276. A source of direct bias voltage is connected between the remaining terminal of the secondary of transformer 276 and arm 182. The outside terminals of the secondary of transformer 275 are connected to terminals 191 and 192 as shown in Figure 11. This arrangement provides for a voltage across arm 182 and terminal 191 of $e_1+e_2$ and a voltage across arm 182 and terminal 191 of $e_1-e_2$ neglecting bias voltage produced by direct voltage source 277. Since $e_1$ is proportional to the circuit voltage and $e_2$ is proportional to the circuit current, meter 185 will read the watts flowing in the circuit under measurement in view of the properties already described for the circuit of Figure 7. Other arrangements of transformers 275 and 276 can be utilized to produce the sum and difference of voltages $e_1$ and $e_2$ such as, for example, using two transformers to produce the two $e_2$ voltages.

By using conventional and known means of measuring the phase angle between two alternating current voltages this invention further provides for the direct reading of the power factor of a load simultaneously with the direct reading of power, current, and voltage.

Furthermore, this instrument is capable of covering wide ranges of operation. A development model has been constructed to operate on currents from 0.001 ampere to 50 amperes at voltages from 0.5 volt to 500 volts for full scale deflection of the indicating instruments. This provides for full scale power readings of from 0.0005 watt to 25,000 watts or a power range of 50,000,000 to one. These are not the ultimate limits; they are cited here, however, to indicate the range of measurement that may be incorporated in this type of device.

This invention provides for measurement of power, current, and voltage at audio and radio frequencies with the ease, convenience, accuracy, and directness with which these quantities are measured in direct and power frequency alternating current circuits by the so-called "industrial analyzers" consisting of conventional multi-range wattmeters, ammeters, and voltmeters.

It will be seen from the above that I have provided a means for measuring or indicating power, voltage and current over a wide frequency range without appreciably loading or disturbing the circuits under tests. It will be seen further that I have provided a device which is susceptible to mounting in a unitary housing enabling use with a convenience approaching that of a conventional industrial analyzer.

While the invention is susceptible of various modifications and alternative construction, I have shown in the drawings and have described herein only the preferred embodiments. It is to be understood however that it is not intended to limit the invention by such disclosure, for I aim to cover all modifications and alternative construction falling under the spirit and scope of the invention as defined in the appended claims.

The invention described herein may be made and used by or for the Government of the United States for government purposes without the payment to me of any royalties thereon or therefor.

I claim:

1. A device for measuring the power drawn by an electrical load comprising, in combination, a source of first voltage proportional to the voltage across said load; a source of second voltage proportional to the current flowing through said load; a first amplifier excited by said first voltage and having first and second output leads, a second amplifier excited by said second voltage and having first and second output leads, a first center-tapped resistor, a second center-tapped resistor, phase inverting means having first and second output leads, the first output lead of said first amplifier connected to one end of each of said first and second center-tapped resistors, the first output lead of said second amplifier connected to the other end of said first center-tapped resistor and to the input of the phase inverting means, the first output lead of said phase inverting means connected to the other end of said second center-tapped resistor, whereby said resistors serve as networks producing output signals respectively proportional to the sum and the difference of said first and second voltages between the center taps of said resistors and a common point of said second output lead of said first amplifier, second amplifier and phase inverting means, non-linear resistors respectively having the inputs thereof connected to the center tap of said first and second center tapped resistors, said non-linear resistors allowing passage of currents substantially proportional to the squares of their applied voltages, a third center-tapped resistor fed at its ends by the output of said non-linear resistors, the center tap of said third center-tapped resistor connected to said common point and connected to the inputs of said non-linear resistors through a direct biasing source, and a measuring device connected across said third center-tapped resistor responsive to the average value of the voltage appearing across said third center-tapped resistor whereby said measuring device may be used to measure the power consumed by said load.

2. A device for producing an output proportional to the power drawn by an alternating current load supplied by grounded and ungrounded terminals comprising a series resistor associated with said ungrounded terminal, modulator means associated with said series resistor, a source of power at carrier frequency associated with said modulator and inductively coupled thereto, said modulator arranged to modulate a carrier signal with the signal derived from said series resistor, a demodulator, inductive coupling means between said modulator and said demodulator, a first amplifier excited by the output of said demodulator, a potentiometer across said load acting to produce a voltage proportional to said load voltage, a second amplifier excited by said proportional voltage, a resistor network fed by said first and second amplifiers, said network producing voltages proportional to the sum and difference respectively of the output voltages of said amplifiers, a first non-linear resistor excited by said voltage sum, a second non-linear resistor excited by said voltage difference, said non-linear resistors serving to allow passage of currents proportional to the squares of their applied voltages, direct voltage biasing means in series with said non-linear resistors and output means associated with said non-linear resistors and responsive to the average of the difference of the currents flowing through said non-linear resistors respectively.

3. A device for indicating the power drawn by an alternating current load having grounded and ungrounded terminals comprising a series resistor associated with said ungrounded terminals, a modulator receiving as a modulating signal the voltage drop appearing across said series resistor, a source of carrier power inductively coupled to said modulator, a demodulator inductively coupled to said modulator, said inductive coupling allowing a minimum of capacitance and conductance between said modulator and ground, a first amplifier excited by the output of said demodulator, a high resistance potentiometer across said load, a second amplifier excited by a portion of the voltage existing across said potentiometer, a network associated with said amplifier so arranged as to produce a first voltage proportional to the sum of the amplifier output voltages and a second voltage proportional to the difference of the amplifier output voltages, a first non-linear resistance excited by said voltage sum, a second non-linear resistance excited by said voltage difference, said non-linear resistors passing currents proportional to the squares of their applied voltages, direct biasing potential means associated with each of said non-linear resistors, a center-tapped resistor bridging the output terminals of said non-linear resistor, the center of said center tapped resistor returning to ground potential, electrical indicating means responsive to the average value of the voltage appearing across said center tapped resistor to indicate the power drawn by the load.

4. A device for indicating the power drawn by a high frequency alternating current load having a grounded and an ungrounded terminal comprising: a series resistor associated with said ungrounded terminal and producing a voltage drop proportional to the current drawn by said load, modulating means associated with said series resistor, a source of carrier frequency associated with said modulator, said modulator acting to modulate said carrier with the signal produced across said series resistor, demodulator means, said carrier source and said demodulator means arranged for a minimum of capacitive and conductive coupling with said modulator, a first amplifier excited by the output of said demodulator, a potentiometer across said load, a second amplifier excited by a portion of the voltage across said potentiometer, a resistor network fed by said amplifiers, said network producing a voltage proportional to the sum of said amplifier output voltages and a voltage proportional to the difference between the amplifier output voltages, a first electric discharge device having a grid, plate and cathode, said grid excited by said voltage sum, a second electric discharge device including a grid, plate and cathode, said grid excited by said voltage difference, first and second non-linear resistances included in the circuits of said cathodes respectively, said non-linear resistances allowing passage of currents proportional to the squares of their applied voltages, a source of direct potential applied between said plates and ground, electrical indicating means responsive to the average value of the difference between the currents flowing through said non-linear resistors.

5. In a device for measuring the power drawn by a load in an alternating current circuit wherein a voltage proportional to the load current is added to a voltage proportional to the load voltage to produce a voltage sum and wherein a voltage proportional to the load current is subtracted from a voltage proportional to the load voltage to produce a voltage difference comprising, in combination, a first electric discharge device having a grid, plate and cathode, said grid being excited by said voltage sum; a second electric discharge device including a grid, plate and cathode, said grid being excited by said voltage difference; a source of direct potential applied between said plates and ground, cathode resistors in said cathode circuits respectively each having one side thereof grounded; non-linear resistors having input terminals and output terminals respectively, coupling capacitors between said cathodes and the input terminals of said non-linear resistors respectively, a source of direct biasing potential in a series circuit with said non-linear resistors, each of said non-linear resistors allowing current flow in proportion to the square of its applied voltage, measuring means responsive to the average of the difference between the currents flowing through said non-linear resistors, a center tapped shunt having a high impedance to alternating currents connected to the input terminals of said non-linear resistors with said center tap connected to one side of said biasing source, said shunt forming a portion of said series circuit and serving as a low resistance path for the biasing currents caused by said biasing voltage and said capacitors having a low impedance to said alternating currents said capacitors serving to block the flow of said components of said cathode currents in said non-linear resistors and to restrict the flow of said biasing currents to said shunt and said non-linear resistors whereby the effect of the direct components of cathode currents have a substantially negligible effect on the operation of said measuring means.

6. An analyzer for alternating current circuits for producing readings of current, voltage and power for a load having a grounded and an ungrounded terminal comprising, in combination, a series resistor associated with said ungrounded terminal and producing a voltage drop signal proportional to the current flowing through said load; a modulator associated with said resistor; a source of carrier signal inductively coupled to said modulator; a demodulator inductively coupled to said modulator, said modulator serving to modulate said carrier with the voltage signal derived from said series resistor and said demodulator arranged to reconstitute a voltage proportional to the signal across said series resistor; a first amplifier excited by the output of said demodulator, current indicating means responsive to the output voltage of said first amplifier to provide said readings of current; a potentiometer across said load; a second amplifier excited by a portion of the voltage across said potentiometer; voltage indicating means responsive to the output voltage of said second amplifier to provide said readings of voltage; network means including a phase inverter excited by the output of said first amplifier to produce a voltage equal to the sum of the amplifier output voltages and a voltage equal to the difference of the amplifier output voltages; first and second non-linear resistors excited by said voltage sum and said voltage difference respectively, said non-linear resistors serving to pass currents in proportion to the squares of their applied voltages, a source of direct biasing voltage associated with each of said non-linear resistors, and power indicating means responsive to the average value of the difference in the currents flowing through said non-linear resistors respectively to provide said readings of power.

7. In the analyzer of claim 6, means responsive to the output of said demodulator and the voltage across said potentiometer to indicate the angular phase displacement between the current and voltage applied to said load.

8. A device for measuring power drawn by an alternating current load comprising a series impedance connected in an ungrounded current path to said load, a modulator adapted to produce a relatively high frequency voltage modulated in accordance with the voltage across said resistance, power for said modulator being supplied from a relatively high frequency source through low-capacitance inductive couplings, a demodulator inductively coupled to said modulator, said demodulator coupling serving to introduce a minimum degree of capacitive coupling, and means responsive to the output of said demodulator and the voltage across said load for measuring power flow to said load.

9. In the analyzer of claim 6, having a non-linear resistor connected in the circuit of the power indicating means, said non-linear resistor serving to expand a portion of the operating range of the power indicating means.

10. A means for producing an output voltage comprising, in combination, a voltage derived across an impedance connected in an ungrounded side of a circuit, an ungrounded modulator excited by said voltage and operated at a first reference potential above ground substantially equal to that of the ungrounded side of said circuit, a relatively high frequency oscillator, a low capacity and low conductivity inductive coupling between said oscillator and said modulator through which power is supplied from said oscillator to said modulator, a demodulator provided with an output circuit the reference potential of which is different from the aforesaid first reference potential, and a low capacity, low conductivity inductive coupling between said modulator and said demodulator, whereby the output voltage of said demodulator is proportional to said voltage derived across said impedance.

11. A means for measuring the amount of current supplied to an electrical load from a source of electrical energy through a circuit one side of which is grounded comprising, in combination, a voltage derived across the impedance connected in an ungrounded side of said circuit in which said load current flows, a modulator excited by said voltage and operated at a potential above ground substantially equal to that of the ungrounded side of said circuit, a relatively high frequency oscillator, a low capacity and low conductivity inductive coupling between said oscillator and said modulator through which power is supplied from said oscillator to said modulator, a demodulator provided with an output circuit the reference potential of which is different from the aforesaid first reference potential, a low capacity and low conductivity inductive coupling between said modulator and said demodulator, and means connected to the output of said demodulator to measure the output voltage thereof which will be proportional to the current flowing through said impedance.

12. A device for producing an output voltage proportional to the product of two voltages and the cosine of their relative angular displacement comprising, in combination, network means for obtaining the sum and difference of said two voltages, first and second electric discharge devices each comprising a grid, plate and cathode, said grids excited by said voltage sum and said voltage difference respectively, one terminal each of two non-linear resistors connected to the cathodes of said first and second discharge devices, the other terminals of said non-linear resistors connected to the outer terminals of a tapped resistor, each of said non-linear resistors permitting current flow substantially proportional to the square of voltage applied across the terminals thereof, said plates supplied with a direct potential from a source independent of said two voltages applied between said plates and the tap of said tapped resistor, a triple tapped resistor having the outer terminals thereof connected respectively to said cathodes and the middle tap thereof connected to the tap of said aforementioned tapped resistor, means for adjusting the position of said middle tap on said triple tapped resistor, resistors respectively connecting said grids to the other two taps of said triple tapped resistor whereby direct biasing potentials independent of said two voltages are impressed upon said discharge devices to effect the flow of predetermined biasing currents through said non-linear resistors, and a circuit connected to the said outer terminals of said tapped resistor responsive to the average value of the difference of the currents resulting from said sum and difference voltages to produce said output voltage.

13. A device for the measurement of electrical power comprising a source of first voltage proportional to the load voltage, a source of second voltage proportional to load current, network means for extracting the sum and difference of said first and second voltages, a first circuit to which said voltage sum is applied, a second circuit to which said voltage difference is applied, said circuits each including a non-linear resistor which passes a current substantially proportional to the square of its applied voltage, direct biasing potentials impressed upon said first and second circuits for effecting the flow of predetermined biasing currents through said non-linear resistors, said biasing potentials derived from means independent of said sources of said first and second voltages and being of values to maintain a continuously stable zero reference level, and measuring means responsive to the average value of the difference of the currents resulting from said sum and difference voltages.

14. A device for producing an output voltage proportional to the magnitude of electrical power supplied to a load comprising a source of first voltage proportional to the voltage across said load, a source of second voltage proportional to the current flowing through said load, network means for extracting the sum and difference of said voltages, a first circuit and a second circuit to which said sum and difference voltages are respectively applied, said circuits each including a non-linear resistor passing a current substantially proportional to the square of its applied voltage, direct biasing potentials impressed upon said first and second circuits for effecting the flow of predetermined biasing currents through said non-linear resistors, said biasing potentials derived from means independent of said first and second voltages and being of values to maintain a continuously stable zero reference level, and an integrating circuit connected to said first and second circuits responsive to the average value of the difference of the currents resulting from said sum and difference voltages to produce said output voltage.

15. A device for producing an output voltage proportional to the product of two voltages and the cosine of their relative angular displacement comprising network means to extract the sum and difference of said two voltages, first and second non-linear resistances, said voltage sum applied to said first non-linear resistor and said voltage difference applied to said second non-linear resistor, said non-linear resistors allowing the passage of a current substantially proportional to the square of their applied voltages, direct biasing potentials impressed upon said first and second non-linear resistances for effecting the flow of predetermined biasing currents therethrough, said biasing potentials derived from means independent of said two voltages and being of values to maintain a continuously stable zero reference level, and a circuit connected to said first and second non-linear resistances responsive to the average value of the difference of the currents resulting from said sum and difference voltages to produce said output voltage.

16. A device for measuring the electrical power drawn by an electrical load comprising, in combination, a source of first voltage proportional to the voltage existing across said load, a source of second voltage proportional to the current drawn by said load; a first amplifier excited by said first voltage, a second amplifier excited by said second voltage; a first network supplied by the output of said amplifiers to produce a first output voltage proportional to the sum of said first and second voltages, a second network supplied by the output of said amplifiers, said second network containing a phase inverter to produce a second output voltage proportional to the difference between said first and second voltages, separate non-linear resistors excited by said output voltages respectively, direct biasing voltage means connected to each of said non-linear resistors for effecting the flow of predetermined biasing currents through said resistors, said biasing voltage being of a value to maintain a continuously stable reference level and derived from means independent of said sources of first and second voltages and said first and second output voltages, said non-linear resistors passing currents proportional to the squares of the voltages supplied to said non-linear resistors, and measuring means connected to said non-linear resistors to measure the average value of the difference between the currents flowing in said non-linear resistors respectively.

17. A device for indicating the power drawn by an electrical load having a grounded and an ungrounded terminal comprising a series resistor in series with said ungrounded terminal, an ungrounded modulator associated with said resistor, an oscillator inductively connected to said modulator and supplying power at carrier frequency thereto, a demodulator the output of which has one side thereof grounded, said demodulator excited through a low capacity and low conductivity inductive coupling by said ungrounded modulator having an output voltage at a reference above ground, a first amplifier excited by said demodulator, a potentiometer across said load, a second amplifier excited by a portion of the voltage existing across said potentiometer, means associated with said amplifiers and responsive to the outputs thereof to indicate the power drawn by the load, said inductive couplings serving to minimize the capacitance and conductance between the ungrounded terminal of said load and the ground.

18. In a device for measuring the amount of power supplied to an electrical load from a source of electrical energy comprising, in combination, means for obtaining a voltage proportional to said load voltage, means for obtaining a voltage proportional to said load current, a source of direct biasing voltage independent of the aforesaid voltages, a first means for obtaining the vector combination of said voltages to produce a first output current proportional to the average square of said voltages, a second means for the vector combination of said voltages to produce a second output current proportional to the average square of said direct biasing voltage, said voltage proportional to the load voltage and also said voltage proportional to the load current which latter voltage is inverted in respect to its use in said first means, circuit means for proportioning the relative magnitude of the direct biasing voltage from said independent source between said first means and said second means to maintain a continuously stable reference level, and means for measuring the difference between the direct current components of said first and second output currents whereby the zero reference of measurement may be adjusted by varying the magniture of the biasing voltage between said first and second means.

19. In a device for measuring the amount of power supplied to an electrical load from a source of electrical energy comprising, in combination, a first source of voltage proportional to the voltage across said load, a first source of voltage proportional to the current through said load, a first source of direct biasing voltage independent of the aforesaid first sources of voltage, a first circuit for combining the voltages from said first sources to provide a first output voltage which has a value proportional to the vector sum of the voltages from said first sources, a second source of voltage proportional to the current through said load which is inverted with respect to said first source of voltage proportional to the current through said load, a second source of direct biasing voltage independent of the said first sources and said second source of voltage, a second circuit for combining the voltages from said second sources and the voltage from said first source proportional to the voltage across the load to provide a second output voltage which has a value proportional to the vector sum of the direct biasing voltage and the voltage from the first source proportional to the voltage across said load and the voltage from the second source proportional to the current through said load, means for proportioning the values of said direct biasing voltages from said first and second sources to maintain a continuously stable zero reference level, first and second non-linear resistors each having a characteristic wherein the current through the resistor varies substantially as the square of the voltage across the resistor, said first non-linear resistor connected in said first circuit and excited by the said first output voltage, said second non-linear resistor connected in said second circuit and excited by the said second output voltage, and means connected to the outputs of said first and second non-linear resistors for measuring a direct current proportional to the difference between the individual direct currents flowing in said resistors.

20. In a device for measuring the amount of power supplied to an electrical load from a source of electrical energy comprising, in combination, a first source of voltage proportional to the voltage across said load, a first source of voltage proportional to the current through said load, a first source of direct biasing voltage independent of the aforesaid sources of voltage, a first circuit for combining the voltages from said first sources to provide a first output voltage which has a value proportional to the vector sum of the voltages from said first sources, a second source of direct biasing voltage independent of said first sources of voltage, means for inverting the voltage from said first source proportional to the current through said load to produce an inverted voltage, a second circuit combining the direct biasing voltage from said second source, the voltage from said first source proportional to the voltage across said load and said inverted voltage to provide a second output voltage which has a value proportional to the vector sum of these voltages, means for proportioning the values of said direct biasing voltages from said first and second sources to maintain a continuously stable zero reference level, first and second non-linear resistors each having a characteristic wherein the current through the resistor varies substantially as the square of the voltage across the resistor, said first non-linear resistor connected in said first circuit and excited by the said first output voltage, said second non-linear resistor connected in said second circuit and excited by the said second output voltage, and means connected to the outputs of said first and second non-linear resistors for measuring a direct current proportional to the difference between the individual direct currents flowing in said resistors.

21. In a device for measuring the amount of power supplied to an electrical load from a source of electrical energy comprising, in combination, a first source of voltage proportional to the voltage across said load, a first source of voltage proportional to the current through said load, a first source of direct biasing voltage independent of the aforesaid first source of voltages, a first circuit for combining the voltages from said first sources to provide a first output voltage which has a value proportional to the vector sum of the voltages from said first sources, a second source of voltage proportional to the current through said load, a second source of direct biasing voltage independent of said first sources and said second source of voltages, a second circuit for combining the voltages from said second sources and the voltage from said first source proportional to the voltage across the load to provide a second output voltage which has a value proportional to the vector sum of the direct biasing voltage and the voltage from the first source proportional to the voltage across said load minus the voltage from the second source proportional to the current through said load, circuit means for adjusting the magnitude of each of the biasing voltages from said first and second sources applied to said first and second circuits to maintain a continuously stable zero reference level, first and second non-linear resistors each having a characteristic wherein the current through the resistor varies substantially as the square of the voltage across the resistor, said first non-linear resistor connected in said first circuit and excited by the said first output voltage, said second non-linear resistor connected in said second circuit and excited by the said second output voltage, and means connected to the outputs of said first and second non-linear resistors for measuring a direct current proportional to the difference between the individual direct current flowing in said resistors.

22. In a device for measuring the amount of power supplied to an electrical load from a source of electrical energy comprising, in combination, a first source of voltage proportional to the voltage across said load, a first source of voltage proportional to the current through said load, a first source of direct biasing voltage independent of the aforesaid sources of voltages, a first circuit for combining the voltages from said first sources to provide a first output voltage which has a value proportional to the vector sum of the voltages from said first sources, a second source of direct biasing voltage independent of said first sources of voltages, means for inverting the voltage from said first source proportional to the current through said load to produce an inverted voltage, a second circuit combining the direct biasing voltage from said second source, the voltage from said first source proportional to the voltage across said load and said inverted voltage to provide a second output voltage which has a value proportional to the vector sum of these voltages, circuit means for adjusting the magnitude of each of the biasing voltages from said first and second sources applied to said first and second circuits to maintain a continuously stable zero reference level, first and second non-linear resistors each having a characteristic wherein the current through the resistor varies substantially as the square of the voltage across the resistor, said first non-linear resistor connected in said first circuit and excited by the said first output voltage, said second non-linear resistor connected in said second circuit and excited by the said second output voltage, and means connected to the outputs of said first and second non-linear resistors for measuring a direct current proportional to the difference between the individual direct currents flowing in said resistors.

JOHN M. FLUKE.

REFERENCES CITED

The following references are of record in the file of this patent:

UNITED STATES PATENTS

| Number | Name | Date |
|---|---|---|
| 1,550,660 | Affel | Aug. 25, 1925 |
| 1,586,533 | Peterson | June 1, 1926 |
| 1,639,805 | McCullough | Aug. 23, 1927 |
| 1,817,765 | Rex | Aug. 4, 1931 |
| 1,850,587 | Joffe | Mar. 22, 1932 |
| 1,869,209 | Mead | July 26, 1932 |
| 2,017,192 | Wolff | Oct. 15, 1935 |
| 2,059,594 | Massa | Nov. 3, 1936 |
| 2,085,905 | Friedrich | July 6, 1937 |
| 2,087,949 | Holden | July 27, 1937 |
| 2,114,298 | Gunn | Apr. 19, 1938 |
| 2,140,016 | Kautter | Dec. 13, 1938 |
| 2,226,288 | Pieplow | Dec. 24, 1940 |
| 2,282,396 | Cravath | May 12, 1942 |
| 2,284,747 | Koch | June 2, 1942 |
| 2,309,481 | Summerhayes | Jan. 26, 1943 |
| 2,314,851 | Barney | Mar. 23, 1943 |
| 2,403,521 | Gilbert | July 9, 1946 |
| 2,405,073 | Troell | July 30, 1946 |
| 2,413,788 | Sargeant et al. | Jan. 7, 1947 |
| 2,414,317 | Middel | Jan. 14, 1947 |